Aug. 27, 1963
G. BALLIN
3,101,751
LIQUID DROPPER ASSEMBLY
Original Filed Sept. 8, 1959
2 Sheets-Sheet 1
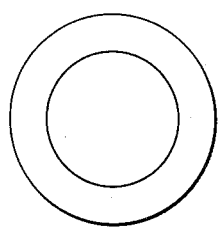
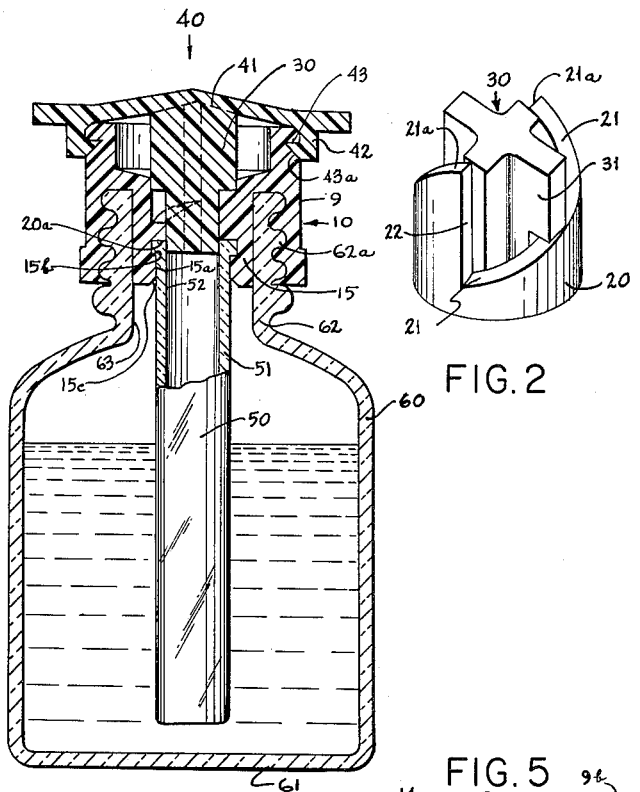
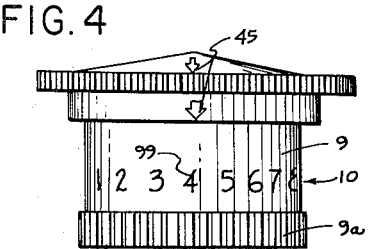
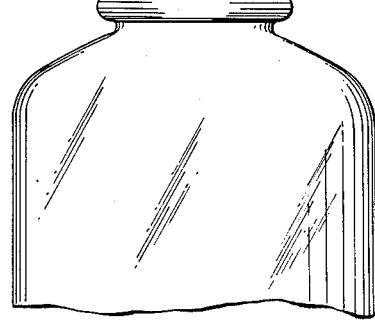
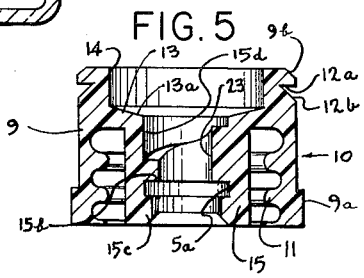
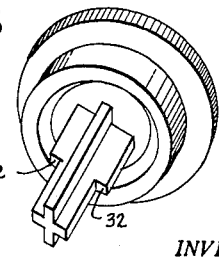
INVENTOR.
GENE BALLIN
BY
Darby & Darby
ATTORNEYS Aug. 27, 1963  G. BALLIN  3,101,751
LIQUID DROPPER ASSEMBLY
Original Filed Sept. 8, 1959  2 Sheets-Sheet 2
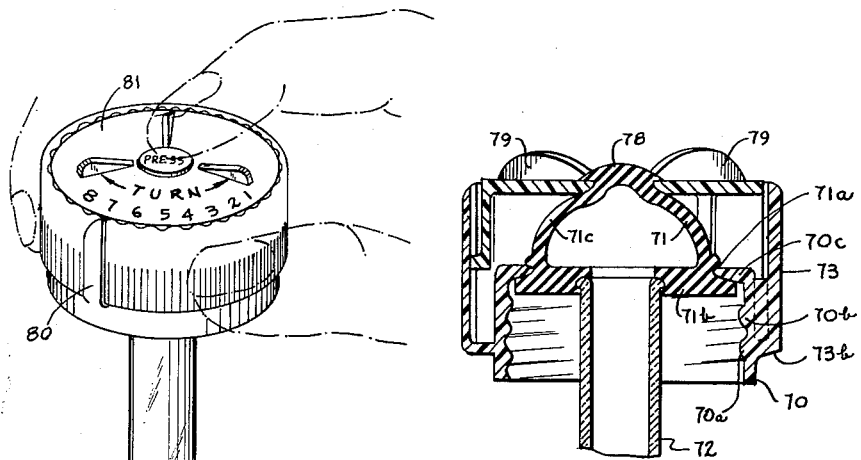
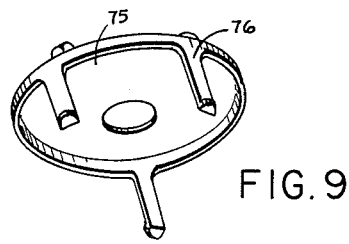
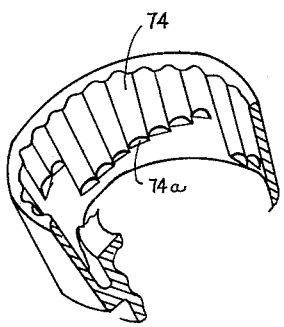
INVENTOR.
GENE BALLIN
BY
ATTORNEYS.

United States Patent Office 3,101,751
Patented Aug. 27, 1963

3,101,751
LIQUID DROPPER ASSEMBLY
Gene Ballin, Freeport, N.Y., assignor to Dosamatic Dropper Corporation, Freeport, N.Y., a corporation of New York
Original application Sept. 8, 1959, Ser. No. 838,678, now Patent No. 3,020,938, dated Feb. 13, 1962. Divided and this application Mar. 20, 1961, Ser. No. 96,854
10 Claims. (Cl. 141—24)

This invention relates to improvements in liquid droppers of the type commonly used in dispensing liquid medicines and in other applications.

This application is a division of my copending application, Serial No. 838,678, for "Liquid Dropper Assembly with Metering Means," filed September 8, 1959, now Patent No. 3,020,938.

In many common liquid medicine packages and similar packages in common use, there is incorporated in the cap of the container an elongated tube, known as a dropper, which extends into the liquid and which has a squeeze bulb on its upper end, the object being to squeeze the bulb and then release it so as to draw liquid into the tube prior to removing the cap from the bottle, and then to squeeze the bulb again so as to eject the liquid from the tube.

Frequently, the directions call for a specified number of drops of the liquid to be dispensed, and in some instances the tube is graduated so as to indicate the number of drops of liquid which have been drawn into the tube. In practice, it is extremely difficult to regulate the number of drops of liquid which are drawn into the tube, and the number of drops of liquid which are thereby dispensed.

An important object of this invention is to provide an improved dropper of the type generally described above, and incorporating precise metering and indicating means which are variable at will so as to predetermine the number of drops of liquid which can be drawn into or ejected from the tube of the dropper.

A further object of the present invention is to provide a liquid dropper having positive discharge control so as to accurately and repeatedly determine the number of drops of liquid which can be drawn into the tube or be asperated from the dropper.

Another important object of this invention is to provide a liquid dropper of the type generally described above, and incorporating metering means for predetermining the number of drops which can be drawn into the dropper, regardless of the pressure exerted upon the squeeze bulb, so long as this pressure exceeds a predetermined minimum value.

Another important object of the invention is to provide an improved liquid dropper of the above described type, which is sanitary and simple in construction and operation.

Other objects and advantages of this invention will become apparent from the following description, in conjunction with the annexed drawings, in which preferred embodiments of the invention are disclosed.

In the drawings, a first embodiment of the invention is shown in FIGURES 1–6.

FIG. 1 is a vertical section of the liquid dropper assembly in accordance with said first embodiment, showing the liquid dropper assembly mounted upon a bottle.

FIG. 2 is a fragmentary perspective view of a portion of the medicine dropper assembly, comprising the piston or plunger and the guide therefor.

FIG. 3 is a top plan view of the liquid dropper assembly.

FIG. 4 is a front elevation of the liquid dropper assembly, mounted upon the bottle of FIG. 1.

FIG. 5 is a fragmentary detail view, similar to FIG. 1, of the cap and guide of the dropper assembly.

FIG. 6 is a bottom perspective view of the piston or plunger and head of the liquid dropper assembly.

FIGS. 7–11 show a second embodiment of the invention.

FIG. 7 is a perspective view of the dropper assembly.

FIG. 8 is a vertical section, partly broken away, of the assembly.

FIG. 9 is a bottom perspective view of the plunger.

FIG. 10 is a perspective view, partly broken away, of the cap.

FIG. 11 is a perspective view of the compression bulb of the assembly.

First Embodiment

Upon reference to the drawings in detail, it will be noted that they show a liquid dropper assembly consisting generally of cap 10, guide 20, piston or plunger 30, head 40 and tube 50, this dropper assembly being adapted to be mounted upon bottle 60. As will be explained in detail below, cap 10 and guide 20 are either molded in one piece or are secured together with cap 10 being adapted to be screwed onto the outside of the neck of bottle 60, and with guide 20 adapted to be received inside the neck of bottle 60. Head 40 and plunger 30 are also either molded in one piece or are secured together permanently, with resilient head 40 adapted to be secured over the top of cap 10 and with plunger 30 extending into guide 20. Tube 50 is adapted to be fixed to the lower end of guide 20, with plunger 30 being reciprocable and turnable within guide 20 and also within tube 50. As will also be explained in detail below, by adjusting the turned position of head 40, and hence of plunger 30, it is possible to adjust the extent to which plunger 30 may be depressed within guide 20 and tube 50. This determines the amount of liquid which is drawn into tube 50 when resilient head 40 is released and returns to its upper position.

Said bottle 60 and cap 10 may be any suitable interfitting shape. Optionally, and without limitation thereto, bottle 60 is of cylindrical shape with the usual bottom wall 61 and with a neck 62 of decreased diameter. Said neck 62 has an interior through bore 63 which is optionally cylindrical. Optionally, said neck 62 has the usual external screw thread 62a. For convenience of description, but without limitation thereto, bottle 60 and the liquid dropper assembly in accordance with this invention will be described with reference to the position thereof of FIG. 1, which will be assumed to be the upright vertical position of the assembly.

Cap 10 is shown in detail in FIGS. 1 and 5, and is also shown in FIG. 4. Said cap 10 preferably has a cylindrical peripheral wall 9 with an internal screw thread 11 mating with threads 62a on bottle neck 62 and extending to the bottom open end thereof. Optionally, the outer lower portion 9a of the peripheral wall 9 of cap 10 is of slightly enlarged external diameter and is knurled. The upper end of cap peripheral wall 9 is chamfered as indicated by the reference numeral 9b, or in other words is beveled downwardly and outwardly, starting at the upper end of cap 10.

Just below the chamfer or bevel 9b, an external peripheral groove 12 is formed in cap peripheral wall 9. This groove 12 has an upper surface 12a which is transverse to the vertical axis of the assembly and which is annular. A bevel surface 12b of groove 12 extends downwardly and outwardly from the inner edge of surface 12a, and extends to the outer periphery of the cap peripheral wall.

Slightly below the level of groove 12 is an internal, transverse, annular flange 13 formed on cap peripheral wall 9. This flange 13 defines a cylindrical recess 14 in the upper end of cap 10. Optionally, the upper face 13a of flange 13 is cut away or beveled so as to be somewhat disc-shaped.

Cap 10 also includes an internal cylindrical sleeve 15 which is integral at its upper end with flange 13 and which extends downwardly therefrom. Said cylindrical sleeve 15 is coaxial with the peripheral wall 9 of cap 10. In assembled position, when cap 10 has been screwed onto the outer face of bottle neck 62, advantageously sleeve 15 extends frictionally and turnably into bottle neck bore 63 for forming a leak proof fit.

Cap wall 9, sleeve 15 and flange 13 are optionally and preferably molded in one piece. While in FIGS. 1 and 2, guide 20 is shown as integral with sleeve 15, this is for convenience of illustration; and it will be apparent from FIG. 2 that guide 20 may optionally be fabricated separately from sleeve 15, and may be fixed to sleeve 15 by any suitable means.

Said guide 20 is of general cylindrical shape and extends in bore 15d of sleeve 15 from the level of the bottom face of flange 13 to approximately the mid-point of sleeve 15. The bottom and surface of guide 20 is annular and is transverse to the axis of the assembly. Somewhat below the lower end surface 20a of guide 20, the bore 15d of sleeve 15 is of reduced diameter, as indicated by the reference numeral 15a, to define an annular shoulder 15b which faces and is spaced from the guide end surface 20a.

Sleeve 15 is preferably beveled or chamfered as designated by the reference numeral 15c, at the lower end of bore 15d.

Cap 10 is made of material which is relatively rigid, but which is such that sleeve 15 is somewhat flexible and resilient, such as a synthetic plastic.

Preferably tube 50 is of hollow cylindrical shape and has an annular head 51 of enlarged external diameter. In assembly, tube 50 is urged frictionally upwardly through the lower end of sleeve bore 15d and into abutment with guide end surface 20a, with head 51 extending frictionally into the space between surface 20a and shoulder 15b and bounded peripherally by sleeve bore portion 15d. Optionally, tube 50 may be molded integrally with sleeve 15.

When cap 10 is screwed onto bottle neck 62, tube 50 extends to a point slightly above bottom wall 61 of container 60. The bore 52 of tube 50 is of the same diameter as and axially aligned with bore 23 of guide 20.

When cap 10 is screwed onto neck 62, flange 13 overlies the lip of neck 62. Optionally, any suitable annular gasket may be provided between flange 13 and the lip of neck 62, such gasket being conventional and being omitted in the drawing.

The upper end of guide 20 is provided with two cutouts to define helical upper ramp edges 21 of guide 20. Said ramp edges 21 have respective upper ends 21a which are at the upper end of guide 20 and which are diametrically opposed. The lower end of one edge 21, designated by the reference numeral 21b, is located in vertical alignment with end 21a of the other edge 21, or in other words the two respective ends 21a and 21b of respective edges 21 are connected by an edge 22 which extends vertically or in a direction parallel to the central vertical axis of the assembly. If desired ramp 21 may be roughened or have a plurality of transverse steps thereon to aid in properly positioning plunger 30 as will be seen below.

Preferably head 40 is flexible and resilient and of disc-shape with a central raised portion 41. Head 40 has a depending cylindrical flange 42 located inwardly of the periphery thereof. Flange 42 has an inturned bottom annular peripheral flange 43 with beveled lower surface 43a. Flange 43 extends frictionally turnably into the correspondingly shaped external annular peripheral groove 12 which has been previously described to form an air tight seal.

Plunger 30 depends from head central portion 41 and into bore 15d. Plunger 30 is generally cylindrical but advantageously has four longitudinal cut-outs 31 for drainage of liquid from the space above flange 13 to tube 50. Plunger 30 has a pair of radially protruding extensions 32 which respectively are aligned with ramp edges 21.

It is apparent that the turned position of head 41 and the corresponding turned position of plunger extensions 32 determine the extent to which plunger 30 may be extended into tube 50 until extension 31 strikes ramp edges 21. This in turn determines the amount of liquid drawn into tube 50 when head 40 is released and it returns to its normal position. Furthermore, the charge which can be drawn into tube 50 is independent of the amount of force exerted on head 40, as long as the force is sufficient to lower plunger extensions 32 into engagement with ramp edges 21.

Arrow 45 on head 40 cooperates with calibrated numerical scale 99 on head 9 to determine the turned position of head 40, the number to which arrow 45 points indicating the number of drops which can be drawn into tube 50.

Illustratively two cut-outs were shown in guide end edge 21 which cooperate with plunger extensions 32. The number of cut-outs can be varied; for example, one helical curved surface may be used, or three or more surfaces may be provided, as deemed advantageous.

*Second Embodiment*

This embodiment works on the same principle as the first embodiment.

The assembly includes cap 70 with internal screw thread 70a on its peripheral wall 70b and with apertured top wall 70c. Dome-shaped squeeze bulb 71 is received within the aperture of wall 70c with wall 70c snapped into peripheral groove 71a of bulb 71. Bulb 71 has an apertured bottom wall 71b in which dropper 72 is received in air tight communication.

In this embodiment, the guide 73 is external to and of greater diameter than the peripheral wall of cap 70. Guide 73 is preferably cylindrical and has an inturned bottom annular peripheral flange 73b which connects with the peripheral wall of cap 10 slightly above the bottom end thereof. Guide 73 has circumferentially successive, longitudinally extending grooves 74 in its inner face and extending downwardly from its top edge. There are three sets of grooves 74, with the lower ends 74a of the grooves of each set being of graduated height, so that a line connecting said groove ends 74a would be advantageously of helical contour. The short groove of each set is succeeded by the long groove of the next set.

Plunger 75 is of disc-shape with three equally spaced, resilient fingers 76 extending downwardly from the periphery thereof. Plunger 75 has an aperture whose circumferential edge is received within peripheral groove 71c at the top of bulb 71. Plunger 75 is vertically slidably received within guide 73, with fingers 76 respectively slidably received within respective corresponding grooves 74. As shown plunger 75 is rotated so as to snap fingers 76 into different grooves 74. However, guide 73 may be rotated if desired by suitable changes in construction by those skilled in the art.

It will be apparent that the turned position of plunger 75 determines the extent to which it can be depressed, and hence determines the amount of liquid charge received within tube 72 when plunger 75 is released and bulb 71 returns it to its normal position.

Instead of pressing plunger 75, the bulb tip 78 above plunger 75, shown marked "Press," may be pressed downwardly.

Vertical ribs 79 on the top of plunger 75 facilitate turning it. Pointer 80 on the outside of guide 73 cooperates with calibrated peripheral scale 81, illustratively numbered 1 to 8, on the top of plunger 75, with the number on scale 81 which pointer 80 faces, indicating the number of drops of liquid which can be drawn into tube 72.

Preferably, the number of grooves 74 of each set of grooves are correlated to the numbers on scale 81. Thus, if it is desired to vary the dosage between 1 and 8 drops, there can be eight grooves 74 of each set, corresponding to eight numbers on scale 81. In addition, scale 81 is oriented, and the grooves are so spaced, that pointer 80 is positioned facing each of the numbers on scale 81 in correspondence with location of finger 76 in each of the grooves of the set. While three sets of grooves and fingers are shown, this is illustrative and may be varied.

In each embodiment, there is provided a liquid dropper assembly comprising a cap for bottles and the like having an axially extending tube thereon. An axially movable compression member on the end wall of the tube cooperates with the bore of the tube to define a compression chamber for use in moving liquid into and out of the tube. In each embodiment, a first member or plunger is coupled to the compression member for axial movement in unison therewith, and a stop member is fixed in the path of compressive movement of the compression member so as to limit such movement and thereby meter the amount of liquid which can be received by the tube and which can be delivered from the tube for the desired use of the liquid.

In the first embodiment, the first member or plunger is a radially flanged axial shank on the compression member which can slide in the tube. The stop member is a cutaway or curved end surface on a guide sleeve in which the shank slides, with the flange opposing the cut-away end surface. The compression member can be turned, thereby varying the spacing between the flange and the cut-away sleeve end surface, so as to vary the extent of movement of the compression member and the amount of liquid which can be drawn into the tube.

In the second embodiment, the first member or plunger has fingers depending from an annular disc which is externally turnably mounted on the compression member. The stop member is a guide sleeve surrounding the cap and shaped to receive the fingers projecting from the disc. The sleeve is cut away to define a curved end surface and an outer peripheral guide surface against which the fingers can slide into abutment with the curved end surface. By turning the disc, the spacing between the fingers and the end surface can be varied, to the same effect as in the case of the first embodiment.

While I have disclosed preferred embodiments of my invention and have indicated various changes, omissions and additions which can be made therein, it will be apparent that various other changes, omissions and additions may be made in the invention without departing from the scope and spirit thereof.

What is claimed is:

1. A liquid dropper assembly comprising a cap for bottles and the like having an outer end with at least a partial central opening and a peripheral wall which has an axis, a resilient compression member mounted on said end over and completely enclosing said opening and having an axially movable portion biased to normal outer portion, said cap and said compression member forming an air-tight compression chamber, an axially extending tube, means mounting said tube for air-tight communication with said compression chamber, a compression limiting member mounted on said axially movable portion of said compression member without said compression chamber and axially movable in unison therewith, a guide member fixed to said cap and positioned and shaped to receive said compression limiting member axially slidably, said guide member being a sleeve located radially outwardly of an extending around said cap peripheral wall, said sleeve having a series of axially extending grooves of different depths with an end wall for selectively engaging said compression limiting member, said compression limiting member having a longitudinally extending finger shaped to extend slidably in a respective groove of said sleeve, said compression member being turnable about said axis, said finger and said groove end walls being cooperatively shaped to vary the distance therebetween depending upon the turned position of said compression member.

2. A metering cap for a liquid dropper assembly comprising a first piece having a peripheral wall which has an axis and with an opening at one end, a second piece rotatably mounted on said first piece and having a resilient continuous wall completely enclosing and sealing said opening and axially movable, a plurality of fingers carried by said second piece in equal spaced circumferential position and extending longitudinally in the direction of movement of said resilient wall, a stop element mounted on said first piece for cooperative engagement with said arms, said stop element having a cylindrical wall coaxial to said first piece and adapted to slidably receive said fingers, said cylindrical wall having a plurality of corresponding sets of longitudinally extending grooves therein, each set of grooves having end surfaces at different depths and slidably engaging a respective finger, said end surfaces and said fingers being cooperatively shaped for limiting inward movement of said resilient wall, each of said fingers being slidably and selectively engageable with a corresponding groove in each of said sets of grooves in said stop element.

3. A liquid dropper assembly comprising a first piece having an outer end with an opening and a peripheral wall which has an axis, a resilient compression member rotatably mounted on said end over said opening and having an axially movable portion biased to normal outer position, said first piece and compression member forming an air-tight compression chamber, an axially extending tube, means mounting said tube on said first piece with the bore of said tube in air-tight communication with said compression chamber, a compression limiting member mounted on said axially movable portion and without said compression chamber and axially movable in unison with said compression member, a guide member mounted to said first piece and positioned and shaped to receive said compression limiting member axially slidably, said guide member having a series of axially extending grooves of different depths each with an end wall for selectively engaging said compression limiting member, said compression limiting member having an axially extending finger shaped to extend slidably into a respective groove of said guide to adjustably limit the advance of said compression member.

4. A metering cap for a liquid dropper assembly comprising a first piece having a peripheral wall with an axis and with an opening at one end, a second piece rotatably mounted on said first piece and having a resilient continuous wall enclosing and sealing said opening, said resilient wall being axially movable, one of said pieces carrying a finger, said finger extending longitudinally in the direction of movement of said resilient wall, the other of said pieces carrying a stop element coaxial with respect to said peripheral wall and positioned and adapted to receive said finger, said stop element and finger being axially slidable relative to one another upon deflection of said resilient wall, said stop element having a series of grooves of different depths individually and selectively engageable with said finger to limit inward movement of said resilient wall.

5. A metering cap for a liquid dropper assembly comprising a first piece having a peripheral wall with an axis and with an opening at one end, a second piece rotatably mounted on said first piece and having a resilient continuous wall enclosing and sealing said opening, said resilient wall being axially movable, one of said pieces having a finger mounted thereon and extending longitudinally in the direction of movement of said resilient wall and spaced outwardly from said axis, the other of said pieces having a stop element mounted coaxial with respect to said peripheral wall and positioned and adapted to receive said finger, said stop element and finger being axially slidable relative to one another upon deflection of said resilient wall, said stop element having a series of grooves of different depths individually and selectively engageable with said finger to limit inward movement of said resilient wall.

6. A liquid dropper assembly comprising a cap for bottles and the like having an outer end with at least a partial central opening and a peripheral wall which has an axis, a resilient compression member mounted on said end over and completely enclosing said opening and having an axially movable portion biased to normal outer position, said cap and said compression member forming an air tight compression chamber, an axially extending tube, means mounting said tube for air tight communication with said compression chamber, a compression limiting member mounted on said axially movable portion of said compression member without said compression chamber and axially movable in unison therewith, and a guide member mounted on said cap and positioned and shaped to receive said compression limiting member axially slidably, said guide member including stop means for limited axial inward movement of said compression member.

7. A metering cap comprising a first piece having a peripheral wall and with an opening at one end, a second piece mounted on said first piece and having a resilient continuous wall completely enclosing and sealing said opening, one of said pieces having a plunger thereon, the other of said pieces having a stop element thereon and positioned and shaped to receive said plunger, said stop element having a series of grooves of different depths individually and selectively engageable with said plunger to adjustably limit the advance of said plunger with respect to said stop element.

8. A metering cap comprising a first piece having a peripheral wall which has an axis and with an opening at one end, a second piece mounted on said first piece and having a resilient continuous wall completely enclosing and sealing said opening, one of said pieces having a plunger thereon which is spaced from the axis of said peripheral wall, the other of said pieces having a stop element thereon and positioned and shaped to receive said plunger, said stop element having a series of grooves of different depths individually and selectively engageable with said plunger to adjustably limit the advance of said plunger with respect to said stop element.

9. A metering cap comprising a first piece having a peripheral wall and with an opening at one end, a second piece mounted on said first piece and having a resilient continuous wall completely enclosing and sealing said opening, first and second cooperable stop members carried respectively by said first and second pieces for limiting advance of said resilient wall, one of said stop members having a series of steps of different lengths, the other of said stop members being individually and selectively engageable with said one stop member for adjustably determining the longitudinal movement of said resilient wall.

10. A metering cap comprising a first piece having a peripheral wall which has an axis and with an opening at one end, a second piece mounted on said first piece and having a resilient continuous wall completely enclosing and sealing said opening, first and second cooperable stop members carried respectively by said first and second pieces for limiting advance of said resilient wall, said first and second stop members being spaced from said axis, one of said stop members having a series of steps of different lengths, the other of said stop members being individually and selectively engageable with said one stop member for adjustably determining the longitudinal movement of said resilient wall.

References Cited in the file of this patent

UNITED STATES PATENTS

| | | |
|---|---|---|
| 644,703 | Buckley | Mar. 6, 1900 |
| 2,428,577 | Mathis | Oct. 7, 1947 |
| 2,805,798 | Sampson | Sept. 10, 1957 |